__(12)__ United States Patent
Bauer et al.

(10) Patent No.: US 6,861,493 B2
(45) Date of Patent: Mar. 1, 2005

(54) BRANCHED POLYURETHANES, FORMULATIONS COMPRISING THEM, AND THEIR USE FOR THICKENING AQUEOUS SYSTEMS

(75) Inventors: Sandra Bauer, Duisburg (DE); Dirk Edelmann, Radevormwald (DE); Eberhard Esselborn, Essen (DE); Markus Hoschke, Isernhagen (DE); Günthern Link, Wernigerode (DE); Stefan Silber, Krefeld (DE)

(73) Assignee: Goldschmidt AG, Essen (DE)

( * ) Notice: Subject to any disclaimer, the term of this patent is extended or adjusted under 35 U.S.C. 154(b) by 62 days.

(21) Appl. No.: 10/371,900

(22) Filed: Feb. 20, 2003

(65) Prior Publication Data

US 2003/0166770 A1 Sep. 4, 2003

(30) Foreign Application Priority Data

Feb. 23, 2002 (DE) .......................... 102 07 891

(51) Int. Cl.$^7$ ............................... C08G 18/61
(52) U.S. Cl. .................. 528/49; 528/76; 528/28; 524/588; 524/591; 560/26; 516/906; 516/916
(58) Field of Search ............................ 528/28, 49, 76; 524/588, 591; 560/26; 516/906, 916

(56) References Cited

U.S. PATENT DOCUMENTS 4,079,028 A    3/1978   Emmons et al.
4,155,892 A    5/1979   Emmons et al.
4,327,008 A    4/1982   Schimmel et al.
4,426,485 A    1/1984   Hoy et al.
4,499,233 A    2/1985   Tetenbaum et al.
5,023,309 A    6/1991   Kruse et al.

FOREIGN PATENT DOCUMENTS

DE    41 01 239 C1    4/1992
DE    196 00 467 A1   7/1997
DE    196 44 933 A1   4/1998
EP    0 031 777       7/1981
EP    0 307 775       3/1989
EP    0 618 243 A2    10/1994

*Primary Examiner*—Rachel Gorr
(74) *Attorney, Agent, or Firm*—Frommer Lawrence & Haug LLP

(57) ABSTRACT

Branched polyurethanes which are preparable by reacting

A) one or more aliphatic and/or aromatic isocyanates having a functionality of at least three with B) from 90.0 to 99.8 eq. % of one or more polyethers of the structure $$RO(SO)_w(BO)_x(PO)_y(EO)_zH$$

and

C) from 0.2 to 10.0 eq. % of at least one of the compounds from the following group:
  a. polyethers
  b. polyether polydimethylsiloxane diols
  c. polyester polydimethylsiloxane diols
  d. polydimethylsiloxane diols
  e. polydimethylsiloxane diamines
  f. polyether diamines.

25 Claims, No Drawings

BRANCHED POLYURETHANES, FORMULATIONS COMPRISING THEM, AND THEIR USE FOR THICKENING AQUEOUS SYSTEMS

RELATED APPLICATION

This application claims priority under 35 U.S.C. §119 to German application 102 07 891.2, filed Feb. 23, 2002, herein incorporated by reference.

DESCRIPTION OF THE RELATED ART

1. Field of the Invention

The invention relates to innovative branched polyurethanes optionally containing siloxane groups, to formulations comprising them, and to their use for thickening aqueous systems.

2. Description of the Related Art

A large number of polyurethane-based associative thickeners are known. They are linear or branched, generally nonionic, surfactants having discrete hydrophilic and hydrophobic domains. Typical structures of these compounds, their preparation, and their use are described, inter alia, in U.S. Pat. No. 4,155,892 or U.S. Pat. No. 4,079,028.

Polyurethane thickeners of this kind and preparations thereof are suitable auxiliaries for setting rheological properties in aqueous coating systems such as automotive finishes and industrial coatings, plasters and architectural paints, printing inks, pigment pastes, filler dispersions, and cosmetic preparations.

These polyurethane thickeners are prepared from (a) at least one water-soluble polyether polyol, (b) at least one water-insoluble organic polyisocyanate, (c) at least one monofunctional hydrophobic organic compound selected from compounds having a hydrogen atom which is active toward isocyanates and from organic monoisocyanates, and (d) at least one polyfunctional alcohol or polyfunctional ether alcohol.

EP-A-307 775 discloses water-dispersible, modified polyurethane thickeners prepared from (a) a polyisocyanate, (b) a polyether polyol, (c) a modifier having at least 2 active hydrogen atoms and containing at least one hydrophobic group but no groups capable of reacting with polyisocyanate or with the polyether polyol, and (d) an endcapping agent, such as alkoxylated alcohols, for example.

U.S. Pat. No. 4,327,008 describes star-shaped PU thickeners which are reaction products of (a) polyether diols, (b) polyfunctional (>3) polyether polyols or isocyanates, (c) a diisocyanate, (d) based on the polyether diol, from 37 to 175 mol percent of water, and (e) an endcapping monool or monoisocyanate.

Further polyurethane thickeners are described in EP-A-0 031 777, EP-A-0 495 373, U.S. Pat. No. 4,499,233, U.S. Pat. No. 4,426,485, DE-A-41 01 239 and U.S. Pat. No. 5,023,309.

A common feature of these prior art polyurethanes is that hydrophilic segments are present in an amount of at least 50% by weight and there is not more than 10% by weight of hydrophobic segments and urethane groups. By hydrophilic segments in this context are meant, in particular, high molecular mass polyether chains, composed in particular of ethylene oxide polymers. By hydrophobic segments are meant, in particular, hydrocarbon chains having at least six carbon atoms.

The skilled worker is well aware that effective thickeners can only be obtained if the hydrophilic polyether segments have a molecular weight of at least 6,000 g/mol and are composed almost exclusively of polyethylene oxide; the hydrophobic segments contain at least 12 carbon atoms, and hydrophilic and hydrophobic segments are present in a balanced weight ratio of from 92 to 97%: from 8 to 3%.

Moreover, these polyurethanes ought to have a very low inherent viscosity, in order that they can be handled without problems and processed, where appropriate, in the form of very highly concentrated solutions.

This requirement precludes, for example, the obvious preparation of long hydrophilic segments by chain-extending reaction of comparatively low molecular mass polyether diols with diisocyanates, since the greater number of urethane groups this entails would result in an unwanted increase in the inherent viscosity.

More recently, numerous attempts have been undertaken to lower the inherent viscosity of the thickeners. As the skilled worker is aware, however, a mere reduction in molecular weight is accompanied by a deterioration in the thickeners' effectiveness.

One other possibility is based on the addition of typical emulsifier structures (DE-A-196 00 467), including, in particular, acetylenediol derivatives (EP-A-0 618 243). The further addition of diesters has also been described (DE-A-196 44 933).

The compounds thus prepared have the disadvantage, first, that they have to be used at high concentrations in order to achieve a satisfactory reduction in the inherent viscosity of the thickener. Moreover, they entail a series of further disadvantages, such as the stabilization of foam these surfactants bring about in the aqueous systems in which these thickener preparations are present, such as dispersion-based architectural paints, for example. Furthermore, there are unwanted reductions in the water resistance and weathering stability of coating systems and also, in the case of architectural paints, in their scrub resistance.

A further common method, known from the literature, for reducing the inherent viscosity of aqueous solutions of polyurethanes is to add water-soluble or water-miscible solvents, such as alcohols or glycol derivatives, for example. A key disadvantage of this method is that it entails to an undesirable extent introducing solvents into otherwise environmentally compatible coating systems, which goes against the spirit of VOC reduction.

It is known that the problems depicted occur to an increased extent in the case of the desired, extremely pseudoplastic, branched polyurethane thickeners.

OBJECTS OF THE INVENTION

It is an object of the present invention, therefore, to provide polyurethane thickeners which lead to extreme pseudo-plasticities and to provide low-foam, VOC-free preparations, produced from them, which are easy to handle and to meter, combine a low inherent viscosity with extremely effective thickening, and, in particular, do not display any adverse effects on properties of the final coating such as scrub resistances and weathering stabilities.

SUMMARY OF THE INVENTION

This object is surprisingly achieved by means of branched polyurethanes optionally containing siloxane groups and obtainable by reacting A) one or more aliphatic and/or aromatic isocyanates having a functionality of at least three with
  B) from about 90.0 to about 99.8 eq. % of one or more polyethers of structure RO(SO)w(BO)x(PO)y(EO)zH and
  C) from about 0.2 to about 10.0 eq. % of at least one of the compounds from the following group:
  a. polyethers of structure HO(SO)w'(BO)x'(PO)y'(EO)z'H b. polyether polydimethylsiloxane diols of structure HO(SO)w'(BO)x'(PO)y'(EO)z'Z-PDMS- Z(EO)z'(PO)y'(BO)x'(SO)w'OH c. polyester polydimethylsiloxane diols of structure H—(OC$_5$H$_{10}$CO-)y'-Z-PDMS-Z-(CO—C$_5$H$_{10}$O-)y'-H d. polydimethylsiloxane diols of structure

HO—Y-PDMS-Y—OH e. Polydimethylsiloxane diamines of structure

R'NH—Y-PDMS-Y—HNR' f. polyether diamines of structure

R'HN—(PO)y'(EO)z'-X-(EO)z'(PO)y'-NHR' in which
  R is hydrogen or a hydrocarbon radical, preferably having 1 to 50 carbon atoms which is optionally substituted or functionalized,
  R' is hydrogen or a hydrocarbon radical, preferably having 1 to 8 carbon atoms, which is optionally substituted or functionalized,
  SO=styrene oxide,
  BO=butylene oxide,
  PO=propylene oxide,
  EO=ethylene oxide,
  PDMS=polydimethylsiloxane
  w=0 to 5,
  x=0 to 5,
  y=0 to 20,
  z=50 to 200,
  w'=0 to 5,
  x'=0 to 5,
  y'=0 to 10,
  z'=1 to 49,
  Z=—C$_n$H$_{2n}$O— or —CH$_2$—CH$_2$—O—C$_n$H$_{2n}$O—, where n=2 to 12;
  X=—C$_n$H$_{2n}$— or —C$_6$H$_4$—, where n=2 to 12;
  Y=—C$_m$H$_{2m}$—, in which m=1 to 8.

DETAILED DESCRIPTION OF THE INVENTION

These polyurethanes according to the present invention can be prepared by processes corresponding to the prior art (U.S. Pat. No. 4,155,892).

They are based on aliphatic or aromatic isocyanates with a functionality of at least three, or corresponding isocyanate oligomers, the use of mixtures of these compounds also being possible.

The structure of the trifunctional isocyanates used in accordance with the invention has no substantial influence on the thickening properties. As commercial products they are available under the respective tradenames, examples being:

Aliphatic triisocyanates:
Vestanat® T 1890-100 (from Degussa); Desmodur® N 100 (from Bayer); Desmodur® N 3200; Desmodur® N 3300; Desmodur® N 3600;
Desmodur® 4470 SN;
Aromatic isocyanates:
Desmodur® IL; Desmodur® L; Suprasec® DNR (from Huntsman).

Preference is given to using aliphatic structures, and especially to using hexamethylenediisocyanate (HDI) oligomers, such as Desmodur® N, for example.

These isocyanates with a functionality of at least three can have small amounts, from 0 to about 20 eq. %, of corresponding diisocyanates and/or monoisocyanates added to them in order to regulate the viscosity.

The isocyanate component (A) is first reacted by conventional methods with from about 90 to about 99.8 eq. % of the monool components (B) of structure RO(SO)w(BO)x(PO)y(EO)zH.

The radicals R and the numerical values of the indices w, x, y and z are an important feature with respect to the properties of the compounds.

R is a hydrocarbon radical, preferably having 1 to 50 carbon atoms, which if desired is also substituted. Preference is given to radicals having from 12 to 22 carbon atoms, $C_{18}$ derivatives being particularly preferred. In the case of relatively short hydrocarbon radicals, the alkylene oxide units, styrene oxide (SO) or butylene oxide (BO) act as hydrophobic segments.

The sum of the ethylene oxide radicals
(z) is from 50 to 200, preferably from 100 to 200, with particular preference from 110 to 150.

The sum of the propylene oxide radicals
(y) is from 0 to 20, preferably from 0 to 10, with particular preference from 0 to The sum of the butylene oxide radicals
(x) is from 0.5, preferably from 0 to 3, with particular preference 0 to 1.

The sum of the styrene oxide radicals
(w) is from 0 to 5, preferably from 0 to 3, with particular preference 1.

The skilled worker is aware that these indices represent statistical mean values and that all of the compounds are present in the form of a mixture whose distribution is governed essentially by statistical laws.

Mixtures of different monool components can also be used. These polyether monools are likewise prepared by prior art methods, by addition reaction of aromatic and/or aliphatic oxirane compounds with monofunctional alcohols. The addition of the various alkylene oxides may take place in blocks or statistically; a blockwise arrangement is preferred.

Simultaneously or, preferably, in a second reaction step, from about 0.2 to about 10.0 eq. % of at least one of the diol or diamine components (C) is supplied to the reaction mixture.

(C)(a): In the case of the polyether diols of structure HO(SO)w'(BO)x'(PO)y'(EO)z'-X-(EO)z'(PO)y'(BO)x'(SO)w'H,
  the sum of the ethylene oxide groups
    z' is from 1 to 49, preferably from 10 to 40; that of the styrene oxide monomers
    w' is from 0 to 5, preferably 1; that of the butylene oxide monomers x' is from 0 to 5, preferably 1; and that of the propylene oxide monomers y' is from 0 to 10, preferably 3.

These indices likewise constitute statistical mean values; the addition of the various alkylene oxide monomers may take place statistically or, again, in blocks. The radical X is the —$C_nH_2$— or —$C_6H_4$— radical of an aromatic, araliphatic or aliphatic diol HO—X—OH, preferably ethylene glycol, propylene glycol, butanediol, cyclohexanedimethanol, dihydroxybenzene or dihydroxydiphenylmethane.

(C)(b): In the case of the polyether polydimethylsiloxane diols of structure

H(SO)w'(BO)x'(PO)y'(EO)z'-Z-PDMS-Z-(EO)z'(PO)y'(BO)x'(SO)w'H, the sum of the ethylene oxide groups z' is from 0 to 49, preferably 5 to 30; that of the styrene oxide monomers w' is from 0 to 5, preferably 1; that of the butylene oxide monomers x' is from 0 to 5, preferably 1; and that of the propylene oxide monomers y' is from 0 to 30, preferably 3 to 15.

The number of dimethylsiloxy units in the chain of the polyethersiloxane diols (C)(b) is from 2 to 100, preferably from 10 to 60. It is also possible to replace some or all of the dimethylsiloxy units by phenylmethylsiloxy units. The structural unit Z is governed by the nature of the alcohol used to synthesize the polyethers. As alcohol it is preferred to use allyl alcohol, butenol or hexenol or else the monovinyl ethers of diols.

Formula for a product prepared with addition of (B) and (C)(b):

$$\left[ \begin{array}{c} RO(SO)w(BO)x(PO)y(EO)zCONHC_6H_{12} \\ \diagdown \\ \phantom{xxx} N-C \\ \phantom{xxxxxx} \diagup \phantom{x} \diagdown \\ O=C \phantom{xx} N-C_6H_{12}NHCO-(EO)z(PO)y(BO)x(SO)w-Z\text{---}\!\!\left[SiO(CH3)_2\right]_{1\text{-}15}\!\!\text{---} \\ \phantom{xxxxxx} \diagdown \phantom{x} \diagup \\ \phantom{xxx} N-C \\ \diagup \\ RO(SO)w(BO)x(PO)y(EO)zCONHC_6H_{12} \phantom{xx} O \end{array} \right]_2$$

(C)(c): The polyester polydimethylsiloxane diols of structure

H—(OC$_5$H$_{10}$CO—)$_{y'\text{-}H}$-Z-PDMS-Z-(CO—C$_5$H$_{10}$O—)$_{y'\text{-}H}$ may replace all or else some of the polyether siloxane diols (C)(b). The choice is governed by the intended application of the thickeners being prepared. The index y', which represents the number of polyester groups, is from 1 to 10, preferably 6. The structural unit Z is governed by the nature of the alcohol used for hydrosilylation. As alcohol it is preferred to use allyl alcohol, butanol or hexenol or else the monovinyl ethers of diols.

(C)(d): In the polymethylsiloxane diols of structure

H-Z-PDMS-Z-H which can be used as well the number of dimethylsiloxy units in the chain is from 2 to 100, preferably from 10 to 60. It is also possible to replace some or all of the dimethylsiloxy units by phenylmethylsiloxy units. The structural unit Z is dependent on the nature of the alcohol used for hydrosilylation. As alcohol it is preferred to use allyl alcohol, butenol or hexenol or else the monovinyl ethers of diols.

(C)(e): The number of dimethylsiloxy units in the chain of the polydimethylsiloxanediamines of structure

R'NH—Y-PDMS-Y—HNR' is from 2 to 100, preferably from 10 to 60. It is also possible to replace some or all of the dimethylsiloxy units by phenylmethylsiloxy units. Where an amino siloxane is used the structural unit Y is composed of the radical of the unsaturated amine used for hydrosilylation. Particularly preferred amines are allylamine, methallylamine and N-methylallylamine.

(C)(f): Finally it is possible as well to use polyether diamines of the general structure R'NH-(PO)y'(EO)z'-X-(EO)z'(PO)y'-NHR.

The value z', which represents the number of ethylene oxide units, is from 1 to 49, preferably 2; the value y', which represents the number of propylene oxide units, is from 0 to 10, preferably 3. The radical X is the radical of an aromatic, araliphatic or aliphatic diol HO—X—OH; preferably, the diols ethylene glycol, propylene glycol, butanediol, cyclohexanedimethanol, dihydroxybenzene or dihydroxydiphenylmethane are used.

The indices specified represents statistical mean values, the chain-length distribution being governed by the nature of the preparation method that is chosen. This is well known to the skilled worker and does not constitute part of the subject matter of the specification.

EXAMPLES

The polyurethanes were prepared along the lines of the process described in U.S. Pat. No. 4,155,892.

Synthesis of Polyurethanes:

Example A1

Raw Materials:

1.05 mol of Desmodur® N, 22.0% NCO, molecular weight=572 g/mol, 97 eq % of a polyether prepared starting from lauryl alcohol and alkoxylated with 2 mol of SO and 100 mol of EO; MW according to OHN=4600 g/mol, 1 eq % of a polyether prepared starting from butanediol and alkoxylated with 5 mol of EO and 5 mol of BO; MW according to OHN=638 g/mol and 2 eq % of the polyether siloxane "Tego® Foamex 840"; MW according to OHN= 5220 g/mol.

Procedure 97 eq %, corresponding to 13.386 g, of the polyether prepared starting from lauryl alcohol, of molecular weight 4600 g/mol (the molecular weights are calculated from the OH number), 1 eq %, corresponding to 3.2 g, of the polypropylene-butylene glycol prepared starting from butanediol, of molecular weight 638 g/mol, and 2 eq % of the polyether siloxane "Tego® Foamex 840" of molecular weight 5200 g/mol were charged to the dry reactor under $N_2$. For dewatering the polyether mixture, the products were heated in the reaction vessel to 110° C. and dewatered under reduced pressure (<15 mm) and a gentle stream of nitrogen down to a water content (by the Karl Fischer method) <0.03%. After drying, the mixture was allowed to cool to 80° C. Then 600 g of Desmodur® N, corresponding to 1.05 mol, i.e., having an NCO index of 1.05, were added to the liquid reaction mixture.

First of all the Desmodur® N was intimately mixed with the OH-functional components. Then 5 g of dibutyltin dilaurate were added; a slight exothermic reaction was evident, the increase in temperature being approximately 10° C. There is a marked rise in viscosity over time. After 6 hours the reaction was monitored by a determination of the NCO content. At a NCO figure of <0.01%, the reaction is very largely over.

The product was a wax which is solid at room temperature but very fragile. In the ground state it can be stored without sintering together and is pale in color.

Example A2

Raw Materials 1.05 mol of Desmodur® N, 95 eq % of a polyether prepared starting from stearyl alcohol, are alkoxylated with 3 mol of BO and 80 mol of EO; MW according to OHN= 3230 g/mol 3 eq % of a polyether prepared starting from butanediol, alkoxylated with 1.5 mol of PO and 6 mol of EO; MW according to OHN=410 and 2 eq % of the polyether siloxane "Tego® Glide 440" having an MW according to OHN of 2900 g/mol.

Two-stage Procedure 95 eq %, corresponding to 9690 g, of the polyether prepared starting from stearyl alcohol, of molecular weight 3400 g/mol (the molecular weights are calculated in the OH number), were charged to the dry reactor under $N_2$.

For dewatering the polyether, the products were heated in the reaction vessel to 110° C. and dewatered under reduced pressure (<15 mm) and a gentle stream of nitrogen down to water content (by the Karl Fischer method)<0.03%. After drying the mixture was allowed to cool to 80° C. Then 600 g of Desmodur® N, corresponding to 1.05 mol, i.e., having an NCO index of 1.05, are added to the liquid reaction mixture.

First of all the Desmodur® N was intimately mixed with the OH-functional components. Then 4 g of dibutyltin dilaurate were added; a slight exothermic reaction was evident, with the increase in temperature being approximately 10° C. The reaction mixture was still very liquid.

After an initial reaction time of 1 hour, the pre-dried diol components were added. Using a metering device, 1 eq %, corresponding to 6.15 g, of the polypropylene-polyethylene glycol prepared starting from butanediol, of molecular weight 410 g/mol, and 2 eq %, corresponding to 29 g of the polyether siloxane "Tego® Glide 440", of molecular weight 2900 g/mol, were metered into the closed reactor. Owing to the small molar amount, no exotherm was observed. As a result of the addition of the diol components there was a visible increase in the viscosity. After 6 hours the reaction was monitored by determination of the NCO content. At an NCO figure of <0.01%, the reaction was very largely over. The product is a wax which is solid at room temperature but very fragile. In the ground state it can be stored without sintering together, and was pale in color.

The following compounds are prepared analogously by techniques in accordance with the prior art.

Example A3

As per the synthesis of polyurethane A1, a polyurethane was prepared from 1.05 mol of Desmodur® N, 93 eq % of a polyether prepared starting from stearyl alcohol and alkoxylated with 100 mol of EO; MW according to OHN= 4500 g/mol, 4 eq % of a polyether prepared starting from propylene glycol and alkoxylated with 5 mol of EO and 3 mol of SO; MW according to OHN=610 g/mol and 3 eq % of the polysiloxane diol "Tego HSi-2111" having a molecular weight of 810 g/mol.

The reaction product, after cooling, was a solid wax which was very fragile.

Example A4

As per the synthesis of polyurethane A1, a polyurethane was prepared from 1.05 mol of Desmodur® N, 96 eq % of a polyether prepared starting from stearyl alcohol and alkoxylated with 100 mol of EO; MW according to OHN= 4500 g/mol, 2 eq % of a polyether prepared starting from propylene glycol and alkoxylated with 5 mol of EO and 5 mol of SO; MW according to OHN=830 g/mol and 2 eq % of the polysiloxane diol "Tego® Glide 440" having a molecular weight of 2900 g/mol.

The reaction product, after cooling, was a solid wax which was very fragile.

For comparison purposes, the noninventive product according to Example A5 was synthesized.

Example A5

As per the synthesis of polyurethane A1, a polyurethane was prepared from 1.05 mol of Desmodur® N and 100 eq % of a polyether prepared starting from stearyl alcohol and alkoxylated with 100 mol of EO; MW according to OHN= 4500 g/mol.

The reaction product, after cooling, was a solid wax which was very fragile.

Formulation of the Polyurethanes

The formulations of the polyurethanes A of the invention are composed of (a) from 10 to 40 parts by weight of the above-described polyurethanes A, (b) from 0 to 80 parts by weight of water, (c) from 0 to 30 parts by weight of cosolvent, and (d) from 10 to 80 parts by weight of an emulsifier.

The parts by weight are chosen so that the sum is always 100. These formulations (B) can be used to excellent effect for thickening commercially customary, aqueous binder systems.

As cosolvents it is possible to use the compounds which are known in this field, such as, in particular, alcohols and glycol ethers.

As emulsifiers it is possible to use the products which are customary in this field. In some cases, however, they have the disadvantage of being toxicologically objectionable (nonylphenol ethoxylates) and of inducing unwanted properties in the end product, such as a reduced wet abrasion resistance, for example. A substantial disadvantage of the known substances of low molecular mass is their more or less ready volatility. These compounds, referred to as VOCs, are no longer desirable in coatings, coating materials, varnishes or paints.

In accordance with the invention it is therefore preferred to use compounds of the general structure

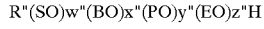

in which

R" is an unsubstituted or substituted hydrocarbon radical having from 1 to 22 carbon atoms, EO is a divalent radical of ethylene oxide, PO is a divalent radical of propylene oxide, BO is divalent radical of butylene oxide, SO is a divalent radical of styrene oxide, w" is 1 to 5, x" is 0 to 5, y" is 0 to 5 and z" is 3 to 30.

These polyethers are in turn in the form of a mixture in a distribution which is governed essentially by statistical laws, and are prepared by the known methods.

The arrangement of the various alkylene oxide monomers may be a statistical or blockwise one, preference being given to blockwise arrangement, especially to that in which the styrene oxide is polymerized directly onto the R" OH alcohol precursor. These emulsifiers effect a drastic reduction in inherent viscosity with increasing styrene oxide content.

Particular preference is given to an emulsifier having a structure similar to that of nonylphenol, composed of isononanol (an isomer mixture of 3,5,5-trimethylhexan-1-ol) as precursor alcohol, alkoxylated with 1.2 mol of styrene oxide and 10 mol of ethylene oxide. This product is labeled below as "emulsifier E".

The preparation of the formulations of the invention is not critical and can be carried out in a manner known per se. Thus it is possible, for example, to add component (d) with stirring and, where appropriate, with heating, to the polyurethane thickener (a) in dispersion in water. Ideally, these steps are carried out immediately following the preparation of polyurethane thickener.

Examples of Formulations B

Emulsifier E, the cosolvent and, additionally where appropriate, the water were added to the polyurethane, which is at a temperature of 80° C., with thorough mixing.

TABLE 1

| Formulation | PU from Example | % by wt. PU | % by wt. emulsifier E | % by wt. cosolvent (propylene glycol) | % by wt. water |
|---|---|---|---|---|---|
| B1 | A1 | 20 | 0 | 30 | 50 |
| B2 | A2 | 20 | 30 | 5 | 45 |
| B3 | A3 | 20 | 35 | 5 | 40 |
| B4 | A4 | 20 | 30 | 5 | 45 |
| B5 | A5 | 20 | 30 | 5 | 45 |
| B6 | A1 | 20 | 30 | 5 | 45 |
| B7 | A1 | 20 | 40 | 5 | 35 |
| B8 | A1 | 20 | 10 | 20 | 50 |
| B9 | A1 | 20 | 60 | 20 | 0 |

The viscosities of the resulting solutions were measured in accordance with the manufacturer's instructions in a Haake RV 12 viscometer using the SV DIN measuring element at 23° C. and 10.3 s$^{-1}$, and are listed in Table 2 in mPa*s units.

TABLE 2

| Formulation | Viscosity at 23° C. and 10.3 s$^{-1}$ |
|---|---|
| B1 | pastelike |
| B2 | 1550 |
| B3 | 1800 |
| B4 | 1620 |
| B5 | 1200 |
| B6 | 710 |
| B7 | 1460 |
| B8 | 3800 |
| B9 | 520 |

The performance examples below, using commercially customary paint formulations, show that the thickening effect of the polyurethane component A of the invention in the aqueous formulations is not impaired by the viscosity-reducing addition of "emulsifiers E" to the architectural paint formula.

Performance Examples

Formulation of an architectural paint based on the styrene-acrylic dispersion "Acronal® 290 D"

TABLE 3

| Product/Manufacturer | Initial amount in g |
|---|---|
| Water | 265.5 |
| Calgon ® N (Benckiser GmbH) 10% in water [Polyphosphate] | 2.0 |
| Thickener of the invention (Formulation B) | 8.5 |
| Foamex ® 8030 (Goldschmidt, Tego Chemie Service), [Polyether siloxane defoamer] | 1.0 |
| Walocel ® XM 30000 (Wolf Walsrode AG) [Cellulose ether] | — |
| NaOH 25% strength | 1.0 |
| Dispex ® N 40 (Allied Colloids Ltd) [Polyacrylate, dispersing aid] | 5.0 |
| Dowanol ® PnB (Dow Chemical) [Dipropylene glycol monobutyl ether, cosolvent] | 5.0 |
| Preventol ® D6 (Bayer AG) [Preservative] | 2.0 |
| Bayertitan ® RKB-5 (Bayer AG) [Titanium dioxide] | 57.0 |
| Socal ® P2 (Solvay Alkali GmbH) [Filler] | 80.0 |
| Microtalc AT 200 (Norwegian Talcum) [Talc] | 91.0 |
| Omyalite ® 90 (Plüss Stauffer AG) [Filler] | 125.0 |
| Omyacarb ® 5 GU (Plüss Staufer AG) [Filler] | 297.0 |
| Acronal ® 290D, (BASF) Styrene-acrylic dispersion [Binder] | 60 |
| Total | 1000 |

The architectural paint based on Acronal® 290 D was admixed with the stated amount of thickener. After a rest time of one day, the viscosity was measured.

The viscosities of the resulting solutions were measured in accordance with the manufacturer's instructions in a Haake RV 12 viscometer using the SV DIN measuring element at 23° C. and 10.3 s–1, and are listed in Table 4 in mPa*s units.

TABLE 4

| Thickener from Example | Viscosity 10.3 * sec$^{-1}$ | Viscosity 100 * sec$^{-1}$ | Viscosity 600 * sec$^{-1}$ |
|---|---|---|---|
| 1B | 6900 | 2500 | 980 |
| 2B | 8600 | 3100 | 1200 |
| 3B | 7500 | 2600 | 960 |
| 4B | 6300 | 2200 | 870 |
| 5B | 1100 | 470 | 230 |
| 6B | 4100 | 2000 | 1250 |
| 7B | 6400 | 2210 | 1000 |
| 8B | 4800 | 2800 | 1640 |
| 9b | 4300 | 2050 | 1270 |
| Comparison: Borchigel ® L 76 (from Borchers) | 330 | 125 | 80 |
| Comparison: PW 25 (from Borchers) | 990 | 320 | 313 |

Formulation of an architectural paint based on "Rhoplex® AC-347" emulsion

TABLE 5

| Product/Manufacturer | Initial amount in g |
|---|---|
| Propylene glycol (BASF) [Cosolvent] | 5.26 |
| Tamol ® 165 (Rohm & Haas) [Polyacrylate, dispersing aid] | 0.86 |
| TEGO ® Foamex 805 (Goldschmidt, Tego Chemie Service) [Polyether siloxane defoamer] | 0.10 |
| Kathon ® LX 1.5% (Rohm & Haas) [Biocide] | 0.17 |
| Ti-Pure ® R 706 (Du Pont) [Titanium dioxide] | 19.46 |
| Minex ® TM 10 (Unimin) [Filler] | 1.95 |
| Water | 1.01 |
| Ammonia solution, 28% strength | 0.19 |
| Water | 4.86 |
| Rhoplex ® AC-347 (Rohm & Haas) [Binder, acrylic dispersion] | 44.94 |
| Rhopaque ® OP-96 (Rohm & Haas) [Filler dispersion] | 4.16 |
| Texanol ® (Eastman Kodak) | 2.12 |
| Triton ® GM-7M (Rohm & Haas) [Wetting agent] | 0.15 |
| TEGO ® Foamex 805 (Goldschmidt, Tego Chemie Servie) [Polyether siloxane defaomer] | 0.29 |
| Thickener of the invention (Formulation B) | 1.10 |
| Water | 13.38 |
| Total | 100 |

This formulation was prepared in the manner familiar to the skilled worker. The components were mixed homogeneously in the order specified in Table 5, using a dispersing disk at 1000 rpm, for 30 minutes.

The architectural paint based on Rhoplex® AC-347 (Rohm & Haas) was therefore modified, as described, with the stated amount of thickener. After a rest time of one day, the viscosity of the resulting solutions were measured in accordance with the manufacturer's instructions in a Haake RV 12 viscometer using the SV DIN measuring element at 23° C. and 10.3 s$^{-1}$, the result is being set out in Table 6 in mPa*s units.

TABLE 6

| Thickener from Example | Viscosity 10.3 * sec$^{-1}$ | Viscosity 100 * sec$^{-1}$ | Viscosity 600 * sec$^{-1}$ |
|---|---|---|---|
| 1B | 1940 | 1170 | 590 |
| 2B | 2550 | 1380 | 690 |
| 3B | 2610 | 1440 | 735 |
| 4B | 2240 | 1250 | 630 |
| 5B | 635 | 455 | 260 |
| 6B | 990 | 640 | 360 |
| 7B | 1120 | 730 | 390 |
| 8B | 1210 | 795 | 420 |
| 9B | 1360 | 870 | 450 |
| Comparison: Borchigel ® L 75 N (from Borchers) | 1580 | 900 | 495 |
| Comparison: Acrysol ® RM 8 (from Rohm & Haas) | 1900 | 1360 | 594 |

The thickener described is not restricted to the applications described. It is equally suitable, in addition, for aqueous leather coatings and for further aqueous industrial coating materials.

The above description is intended to be illustrative and not limiting. Various changes or modifications in the embodiments are known and, as described herein, may occur to those skilled in the art. These changes can be made without departing from the scope or spirit of the invention.

What is claimed is:

1. A branched polyurethane obtainable by reacting
   A) one or more aliphatic and/or aromatic isocyanates having a functionality of at least three with
   B) from about 90.0 to about 99.8 eq. % of one or more polyethers of structure

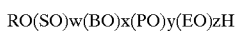
   RO(SO)w(BO)x(PO)y(EO)zH and
   C) from about 0.2 to about 10.0 eq. % of at least one of the compounds from the following group:
   a. polyethers of structure

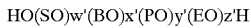
   HO(SO)w'(BO)x'(PO)y'(EO)z'H b. polyether polydimethylsiloxane diols of structure

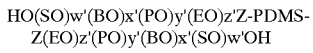
   HO(SO)w'(BO)x'(PO)y'(EO)z'Z-PDMS-Z(EO)z'(PO)y'(BO)x'(SO)w'OH c. polyester polydimethylsiloxane diols of structure

   H—(OC$_5$H$_{10}$CO-)y'-Z-PDMS-Z-(CO—C$_5$H$_{10}$O-)y'-H d. polydimethylsiloxane diols of structure

   HO—Y-PDMS-Y—OH e. polydimethylsiloxane diamines of structure

   R'NH—Y-PDMS-Y—HNR' f. polyether diamines of structure

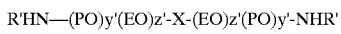
   R'HN—(PO)y'(EO)z'-X-(EO)z'(PO)y'-NHR' in which
   R is hydrogen or a hydrocarbon radical which is optionally substituted or functionalized,
   R' is hydrogen or a hydrocarbon radical which is optionally substituted or functionalized,
   SO=styrene oxide,
   BO=butylene oxide,
   PO=propylene oxide,
   EO=ethylene oxide,
   PDMS=polydimethylsiloxane
   w=0 to 5,
   x=0 to 5,
   y=0 to 20,
   z=50 to 200,
   w'=0 to 5,
   x'=0 to 5,
   y'=0 to 10,
   z'=1 to 49,
   Z=—C$_n$H$_{2n}$O— or —CH$_2$—CH$_2$O—C$_n$H$_{2n}$O—, where n=2 to 12;
   X=—C$_n$H$_{2n}$— or —C$_6$H$_4$—, where n=2 to 12;
   Y=—C$_m$H$_{2m}$, in which m=1 to 8.

2. A branched polyurethane obtainable by reacting
   A) one or more aliphatic and/or aromatic isocyanates having a functionality of at least three with
   B) from 90.0 to 99.8 eq. % of one or more polyethers of structure

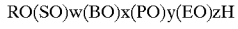
   RO(SO)w(BO)x(PO)y(EO)zH and

C) from 0.2 to 10.0 eq. % of at least one of the compounds from the following group:
polyethers of structure HO(SO)w'(BO)x'(PO)y'(EO)z'H b. polyether polydimethylsiloxane diols of structure HO(SO)w'(BO)x'(PO)y'(EO)z'Z-PDMS-Z(EO)z'(PO)y'(BO)x'(SO)w'OH c. polyester polydimethylsiloxane diols of structure H—(OC$_5$H$_{10}$CO—)y'-Z-PDMS-Z-(CO—C$_5$H$_{10}$O—)y'-H d. polydimethylsiloxane diols of structure

HO—Y-PDMS-Y—OH e. polydimethylsiloxane diamines of structure

R'NH—Y-PDMS-Y—HNR' f. polyether diamines of structure

R'HN—(PO)y'(EO)z'-X-(EO)z'(PO)y'-NHR' in which
R is hydrogen or a hydrocarbon radical of 1 to 50 carbon atoms which is optionally substituted or functionalized,
R' is hydrogen or a hydrocarbon radical of 1 to 8 carbon atoms which is optionally substituted or functionalized,
SO=styrene oxide,
BO=butylene oxide,
PO=propylene oxide,
EO=ethylene oxide,
PDMS=polydimethylsiloxane
w=0 to 5,
x=0 to 5,
y=0 to 20,
z=50 to 200,
w'=0 to 5,
x'=0 to 5,
y'=0 to 10,
z'=1 to 49,
Z=—C$_n$H$_{2n}$O— or —CH$_2$—CH$_2$—O—O—C$_n$H$_{2n}$O—, where n=2 to 12;
X=—C$_n$H$_{2n}$— or —C$_6$H$_4$—, where n=2 to 12;
Y=—C$_m$H$_{2m}$, in which m=1 to 8.

3. The polyurethane as claimed in claim 1, wherein R is an unsubstituted or substituted hydrocarbon radical having from 8 to 22 carbon atoms.

4. The polyurethane as claimed in claim 1, wherein R is an unsubstituted or substituted hydrocarbon radical having from 10 to 18 carbon atoms.

5. The polyurethane as claimed in claim 2, wherein R is an unsubstituted or substituted hydrocarbon radical having from 16 to 18 carbon atoms.

6. The polyurethane as claimed in claim 2, wherein the indices have the following values:
w=0 to 2,
x=0 to 3,
y=0 to 10,
z=50 to 200.

7. The polyurethane as claimed in claim 2, wherein the indices have the following values:
w=0,
x=0,
y=0,
z=80 to 150.

8. The polyurethane as claimed in claim 2, wherein the indices have the following values:
w'=0 to 2,
x'=0 to 2,
y'=0 to 10,
z'=5 to 30.

9. The polyurethane as claimed in claim 2, wherein the index n in Z is from 2 to 6.

10. The polyurethane as claimed in claim 2, wherein the index m in Y is from 3 to 6.

11. The polyurethane as claimed in claim 1, wherein R' is hydrogen or a methyl or ethyl group.

12. The polyurethane as claimed in claim 1, wherein R' is hydrogen.

13. The polyurethane as claimed in claim 1, in which the aliphatic and/or aromatic isocyanates having a functionality of at least 3 is a derivative of hexamethylene diisocyanate or of tolylene diisocyanate or of isophorone diisocyanate.

14. The polyurethane as claimed in claim 1, in which the aliphatic and/or aromatic isocyanates having a functionality of at least 3 is a derivative of isophorone diisocyanate.

15. A formulation comprising from about 10 to about 40 parts by weight of a polyurethane as claimed in claim 1, from 0 to about 80 parts by weight of water, from 0 to about 30 parts by weight of cosolvent and from about 10 to about 80 parts by weight of emulsifier of the general structure R"(SO)w"(BO)x"(PO)y"(EO)z"H, where
R" is an optionally substituted hydrocarbon radical
SO=styrene oxide,
BO=butylene oxide,
PO=propylene oxide,
EO=ethylene oxide,
w"=1 to 5,
x"=0 to 5,
y"=0 to 5,
z"=3 to 30.

16. A formulation comprising from 10 to 40 parts by weight of a polyurethane as claimed in claim 2, from 0 to 80 parts by weight of water, from 0 to 30 parts by weight of cosolvent and from 10 to 80 parts by weight of emulsifier of the general structure R"(SO)w"(BO)x"(PO)y"(EO)z"H, where
R" is an optionally substituted hydrocarbon radical
SO=styrene oxide,
BO=butylene oxide,
PO=propylene oxide,
EO=ethylene oxide,
w"=1 to 5,
x"=0 to 5,
y"=1 to 5,
z"=3 to 30.

17. The formulation as claimed in claim 16, wherein the indices have the following values:

w"=1 to 3, x"=0, y"=0 to 2, z"=5 to 30.

18. The formulation as claimed in claim 16, wherein the radical R" contains from 4 to 12 carbon atoms.

19. A method for thickening an aqueous system which comprises adding a thickening amount of a polyurethane according to claim 1.

20. A method for thickening an aqueous coating system which comprises adding a thickening amount of a formulation according to claim 15.

21. A method for thickening an aqueous, dispersion based coating system which comprises adding a thickening amount of a formulation according to claim 15.

22. An aqueous system comprising, as a thickener, a polyurethane according to claim 1.

23. An aqueous coating system comprising, as a thickener, a formulation according to claim 15.

24. A paint or a printing ink which comprises a pigment and, as a thickener, a polyurethane according to claim 1.

25. A paint or a printing ink which comprises a pigment and, as a thickener, a formulation according to claim 15.

* * * * *